United States Patent [19]
Walliser

[11] 3,791,213
[45] Feb. 12, 1974

[54] TEMPERATURE FEELER
[75] Inventor: Gerhard Walliser, Waiblingen, Germany
[73] Assignee: Daimler-Benz Aktiengesellschaft, Stuttgart-Unterturkheim, Germany
[22] Filed: Oct. 21, 1971
[21] Appl. No.: 191,481

[30] Foreign Application Priority Data
Oct. 30, 1970  Germany.......................... 2053319

[52] U.S. Cl. ............................... 73/339 A, 137/81.5
[51] Int. Cl. ........................................... G01k 11/22
[58] Field of Search.................... 73/339 A; 137/81.5

[56] References Cited
UNITED STATES PATENTS
3,273,377  9/1966  Testerman.......................... 137/81.5
3,442,280  5/1969  Boothe................................ 137/81.5

Primary Examiner—Richard C. Queisser
Assistant Examiner—Denis E. Corr
Attorney, Agent, or Firm—Craig and Antonelli

[57] ABSTRACT

A temperature sensing device for hot gases, which consists of a pneumatic oscillator provided with an inlet channel, a diffusor, and a wedge projecting into the diffusor which is adjoined by two outlet channels, from which branch off two return channels leading to the inlet side of the diffusor whereby the oscillator consists of a lamella packet into which are worked the channels and of two cover plates which are provided at the sides facing the lamella packet with recesses through which a portion of the gases is conducted whose temperature is to be measured.

12 Claims, 3 Drawing Figures

PATENTED FEB 12 1974 3,791,213

TEMPERATURE FEELER

The present invention relates to a temperature-sensing device for hot gases which consists of a pneumatic oscillator, with an inlet channel, a diffusor and a wedge projecting into the diffusor, with two outlet channels adjoining the diffusor, from which one return channel each leads to the nearest side of the diffusor inlet.

If one feeds a gas to the diffusor of such an oscillator, whose channel walls have a rectangular cross section, then the flow normally abuts in a stable manner at one of the two side walls of the diffusor due to slight asymmetries conditioned by manufacture. As oscillating, i.e., a constant jumping of the flow and therewith an alternating abutment at a respective one of the two diffusor walls is effected by the return channels. For example, a flow abutting at the left diffusor wall initiates a pulse at the diffusor inlet by way of the respective return line branching off therefrom, which leads to a reversing or jumping of the flow and to an abutment thereof at the right diffusor wall. Thereafter, the flow again jumps back to the left diffusor wall in the same manner where the same process repeats itself. The frequency of the thus-resulting auto-oscillations depends, inter alia, from the sound velocity of the gas and therewith indirectly from the temperature thereof. For this reason, the frequency represents a measurement for the temperature of the gas and can be utilized for the determination thereof.

It is the aim of the present invention to provide an oscillator which produces accurate measuring values within a large temperature range and which exhibits in particular a short time-constant, i.e., which responds rapidly to temperature fluctuations of the gas. Additionally, the oscillator should be capable of economic manufacture also in case of small numbers.

This is realized according to the present invention in that the oscillator consists of a lamella packet into which are worked the channels, and of two cover plates, at the sides of which facing the lamella packet are provided recesses through which a portion of the gases is conducted, whose temperature is to be measured. The construction of the oscillator from individual thin-walled lamella and from cover plates makes possible a very accurate manufacture of the gas channel that involves slight expenditures. Therebeyond, additional spaces may be further provided in a simple manner through which flow the hot gases. The channels of the oscillator are thereby heated on the outside thereof and assume rapidly the temperature of the hot gases so that very good measuring results can be achieved. The oscillator responds for the same reason also without significant delay to temperature changes of the hot gases which is decisive in particular also during the further processing of the measuring results in control apparatus, for example, for gas turbine propulsion units of aircrafts.

Accordingly, it is an object of the present invention to provide a temperature feeler which obviates by simple means the aforementioned shortcomings and drawbacks encountered in the prior art.

Another object of the present invention resides in a temperature sensing device which is simple in construction and relatively inexpensive in manufacture, even if only produced in small series.

A further object of the present invention resides in a temperature sensing device which produces accurate measuring values over a large temperature range and possesses a relatively small time-constant.

A still further object of the present invention resides in a temperature detecting device of the type described above which responds rapidly to changes in temperature and thus can be readily utlized for further processing of the measuring results.

These and further objects, features and advantages of the present invention will become apparent from the following description when taken in connection with the accompanying drawing, which shows, for purposes of illustration only, one embodiment in accordance with the present invention, and wherein.

Figure 1:
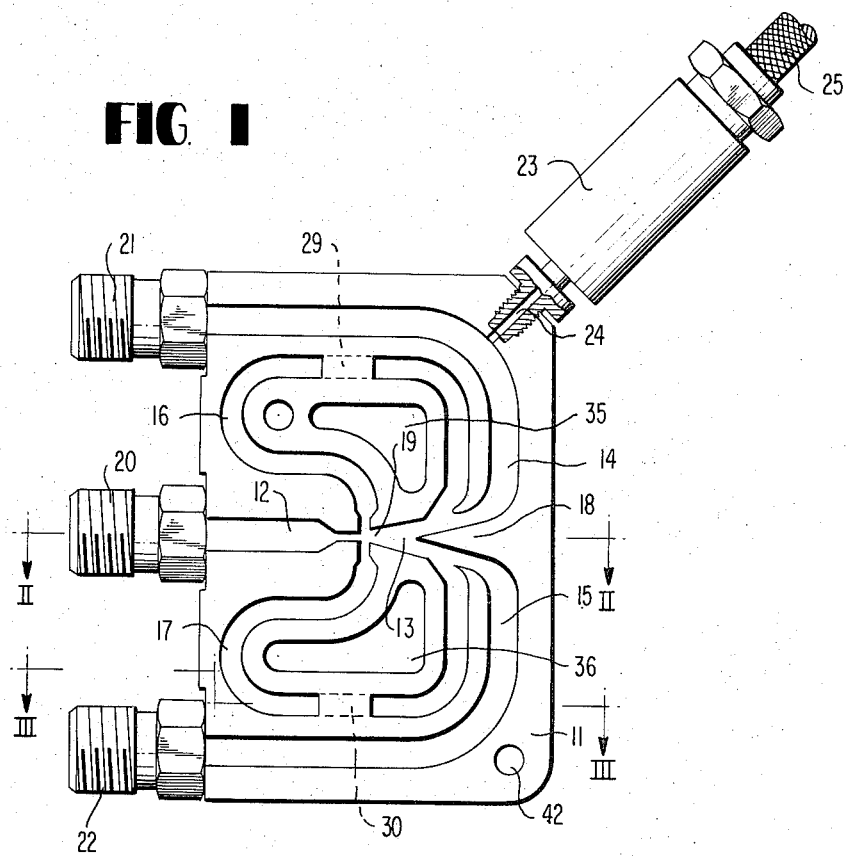
FIG. 1 is a cross-sectional view through a temperature sensing device according to the present invention, taken along line I—I of FIG. 2.

Referring now to the drawing wherein like reference numerals are used throughout the various views to designate like parts, a pneumatic oscillator serves as temperature sensing device which essentially consists of a housing 11 (FIG. 1), in which are arranged an inlet channel 12, a diffusor 13, two outlet channels 14 and 15 and two return channels 16 and 17. All of the channels 12 to 17 inclusive the diffusor 13 have a rectangular cross-section. A wedge 18 projects into the symmetrically constructed diffusor 13, which separates from one another the outlet channesl 14 and 15. The return channels 16 and 17 branch off from the outlet channels 14 and 15 on the side thereof opposite the wedge 18 and terminate at the inlet 19 of the diffusor 13 on mutually opposite places thereof. A connecting member 20 for the inlet channel 12 and connecting members 21 and 22 for the outlet channels 14 and 15 are screwed into the housing 11. Furthermore, a quartz crystal-pressure receiver 23 (FIG. 1) connected to the housing 11 which is connected by way of a channel 24 with the outlet channel 14. A cable 25 leads from the quartz crystal pressure receiver 23 to an indicating apparatus (not shown), for example, to an oscillograph. However, the measurement values may also be fed in lieu thereof to a control device of any known construction. It is also possible, however, to further process the pneumatic pressure impulses of the oscillator directly.

Figure 2:
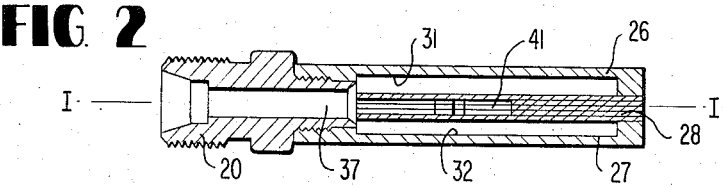
FIG. 2 is a cross-sectional view taken along line II—II of FIG. 1.
Figure 3:
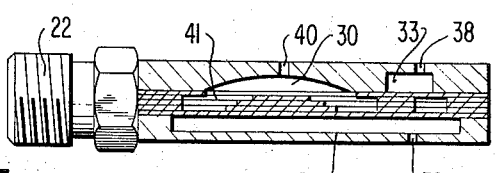
FIG. 3 is a cross-sectional view taken along line III-—III of Fig. 1.

The housing 11 is assembled of a lamella stack 28 (FIG. 2) arranged between two cover plates 26 and 27. A short section 29 and 30 each (FIGS. 1 and 3) of the return channels 16 and 17 extends through the cover plate 26. Additionally, the cover plates 26 and 27 each contain a recess 31 and 32 (FIG. 2), which together with the oppositely disposed outer sides of the lamella stack 28 forms a hollow space 33 and 34 (FIG. 3), respectively. Recesses 35 and 36 (FIG. 1) in the lamella packet 28 serve to keep the mass of the oscillator small and to connect with other the hollow spaces 33 and 34. Since the bore 37 (FIG. 2) of the connecting member 20 slightly projects above and below the lamella packet 28, a portion of the hot gases can flow into the hollow spaces 33 and 34 as well as into the recesses 35 and 36. Bores 38 and 39 (FIG. 3) assure the discharge of the hot gases out of the hollow spaces 33 and 34. As a result of these measures the oscillator is heated rapidly to the temperature of the hot gases after its start. Similarly, its temperature follows with extraordinarily slight delay the temperature fluctuations of the hot gases to be measured. A small bore 40 (FIG. 3) in each of the return channels 16 and 17 connects the same with the surroundings of the oscillator. This facilitates an exchange of the gases in the return channels 16 and 17 whereby—as experiments have clearly demonstrated—the response of the oscillator is further improved.

The individual lamellae 41 of the lamella packet 28 consist, for example, of plates having a thickness of 0.2 mm. and made from a high heat-resistant alloy of any suitable, known type. They are connected with each other in a vacuum furnace by high temperature solder or without solder by diffusion under load. Openings are etched into the individual lamellae 41 prior to the assembly which correspond to the channels 12 – 17 to be formed and the recesses 35 and 36. Any desired form can be manufactured in a simple and inexpensive manner by means of this method. By reason of the fact that the respective section 29 or 30 of each return channel 16 and 17 is extended through the cover plate 26, each lamella 41 constitutes a cohesive, integral structural part notwithstanding its openings which can be joined together with the other lamellae of the lamella packet 28 and the two cover plates 26 and 27. For that purpose, the lamellae 41 are aligned prior to the connection into the lamella packet 28 by means of conical pins and are later on pinned together with the cover plates 26 and 27 by means of fitting pins 41. In this manner, one obtains a very accurately operating temperature-sensing device, by means of which extremely high gas temperatures can be measured with the use of corresponding materials.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intent to cover all such changes and modifications as are encompassed by the scope of the appended claims.

I claim:

1. A temperature-sensing device for hot gases which includes a pneumatic oscillator having an inlet channel means, a diffusor means and a wedge projecting into the diffusor means, which diffusor means and a wedge projecting into the diffusor means, which diffusor means is adjoined by two outlet channel means from which one return channel each leads to the diffusor inlet, characterized in that the oscillator includes a packet of lamellae and two cover plates, in that the inlet and outlet channel means are worked into the lamellae packet, in that the cover plates are provided with recesses at the sides facing the lamellae packet through which is conducted a portion of the gases whose temperature is to be measured, and in that at least one bore is provided in each return channel which connects the same with the surroundings of the oscillator.

2. A temperature-sensing device according to claim 1, characterized in that a section of each return channel is extended through a cover plate.

3. A temperature-sensing device according to claim 2, characterized in that the channel means are constituted by individual lamellae provided with etched openings connected together by the use of high temperature solder in a vacuum furnace.

4. A temperature-sensing device according to claim 3, characterized in that each return channel leads back to the nearest side of the diffusor inlet.

5. A temperature-sensing pneumatic oscillator device for gases, which is constructed of a packet of lamellae positioned between two cover plates; said device comprising:
   inlet channel means;
   diffusor means having a diffusor inlet means communicating with said inlet channel means, wedge means projecting into the diffusor means,
   and two outlet channel means adjoining the diffusor means, each of said outlet channel means including one return channel means leading to the diffusor inlet means;
   wherein said inlet and outlet channel means extend through portions of said packet of lamellae, and wherein at least one of the sides of said cover plates which face said packet of lamellae are provided with recesses for guiding a portion of the gases through said device over flow paths separate from said inlet and outlet channel means such that changes in gas temperature are rapidly transmitted to said packet of lamellae by way of said recesses, said recesses being bounded in the outward direction with respect to said packet of lamellae by said respective cover plate.

6. A device according to claim 5, wherein a section of each return channel is extended through a cover plate.

7. A device according to claim 5, wherein said recesses are formed in both of said cover plates.

8. A device according to claim 7, wherein a section of each return channel is extended through a cover plate.

9. A device acording to claim 8, wherein at least one bore is provided in each return channel which connects the same with the surroundings of the device.

10. A device according to claim 9, wherein said at least one bore extends transversely through one of said cover plates to communicate with one of said sections extended through said cover plate.

11. A device according to claim 5, wherein said inlet channel means includes a connecting member having an opening communicating with an opening in said packet of lamellae, at least one of said recesses extending adjacent said opening in said connecting member, said opening in said connecting member being wider than said packet of lamellae such that a portion of the entering gases passes directly into said at least one of said recesses, whereby changes in gas temperature are rapidly transmitted to said packet of lamellae from the outside of said packet of lamellae as well as by way of that portion of the inlet channel extending through said packet as by way of that portion of the inlet channel extending through said packet of lamellae.

12. A device according to claim 11, wherein said recesses are formed in both of said cover plates.

* * * * *